(12) United States Patent
Cheng

(10) Patent No.: US 11,874,558 B1
(45) Date of Patent: Jan. 16, 2024

(54) SUPPORTING COLUMN FIXED ON LIGHT BAR, LIGHT BAR AND BACKLIGHT MODULE

(71) Applicants: K-TRONICS (SUZHOU) TECHNOLOGY CO., LTD., Jiangsu (CN); BOE TECHNOLOGY GROUP CO., LTD., Beijing (CN)

(72) Inventor: Xianrong Cheng, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/203,749

(22) Filed: May 31, 2023

(30) Foreign Application Priority Data

Aug. 30, 2022 (CN) .......................... 202222294294.6

(51) Int. Cl.
*G02F 1/133* (2006.01)
*G02F 1/13357* (2006.01)

(52) U.S. Cl.
CPC .. *G02F 1/133608* (2013.01); *G02F 1/133611* (2013.01)

(58) Field of Classification Search
CPC ................................................ G02F 1/133608

USPC ............................................................ 349/58
See application file for complete search history.

(56) References Cited

U.S. PATENT DOCUMENTS 5,666,172 A * 9/1997 Ida ..................... G02F 1/133615
362/23.18

FOREIGN PATENT DOCUMENTS

| CN | 103697420 A | * | 4/2014 | |
| CN | 207800071 U | * | 8/2018 | |
| WO | WO-2013120278 A1 | * | 8/2013 | ........... G02B 6/0068 |

* cited by examiner

*Primary Examiner* — Christopher M Raabe
(74) *Attorney, Agent, or Firm* — Chiwin Law LLC

(57) ABSTRACT

A supporting column fixed on a light bar, the light bar and a backlight module are provided. The supporting column includes: a base plate; a supporting sheet arranged on a side of the base plate, wherein one end of the supporting sheet is connected with the base plate and the supporting sheet is configured to be rotatable in a direction towards the base plate and a direction away from the base plate, so that the supporting sheet has a first state and a second state, and an included angle between the supporting sheet and the base plate in the first state is smaller than that in the second state; and a clamping part configured to be clamp-fitted with the supporting sheet upon the supporting sheet being in the second state so as to fix the supporting sheet.

15 Claims, 5 Drawing Sheets

SUPPORTING COLUMN FIXED ON LIGHT BAR, LIGHT BAR AND BACKLIGHT MODULE

CROSS-REFERENCE TO RELATED APPLICATION

The application claims priority to the Chinese patent application No. 202222294294.6, filed Aug. 30, 2022, the entire disclosure of which is incorporated herein by reference as part of the present application.

TECHNICAL FIELD

Embodiments of the present disclosure relate to a supporting column fixed on a light bar, the light bar and a backlight module.

BACKGROUND

In a direct-lit backlight module, a cavity usually has a height of 22 mm and 35 mm, which is referred to as an optical distance (OD). A light diffuser and an optical film are located above the cavity. Generally, the light diffuser has a thickness of 1 mm to 2 mm, and both of the light diffuser and the optical film are made of flexible materials. Therefore, it is necessary to support the light diffuser by using a supporting column, in order to maintain the optical distance unchanged; otherwise, the problem of uneven brightness, as well as other problems caused by a collapse of the light diffuser, for example, a crushing damage to LED, a cracking damage to the light diffuser itself due to the collapse, or the like.

SUMMARY

At least one embodiment of the disclosure provides a supporting column fixed on a light bar, comprising: a base plate; a supporting sheet arranged on a side of the base plate, wherein one end of the supporting sheet is connected with the base plate and the supporting sheet is configured to be rotatable in a direction towards the base plate and a direction away from the base plate, so that the supporting sheet has a first state and a second state, and an included angle between the supporting sheet and the base plate in the first state is smaller than that in the second state; and a clamping part configured to be clamp-fitted with the supporting sheet upon the supporting sheet being in the second state so as to fix the supporting sheet.

In some examples, the supporting column further comprises: a plurality of glue-dispensing bumps arranged on a side of the base plate opposite to the side where the supporting sheet is arranged, and the glue-dispensing bump is configured to be fixedly connected with the light bar.

In some examples, the supporting column further comprises: a first bracket arranged on the side of the base plate provided with the supporting sheet, and the supporting sheet being connected to the base plate through the first bracket; and a second bracket arranged on the side of the base plate provided with the supporting sheet, and the clamping part being arranged on the second bracket.

In some examples, a side of the supporting sheet close to the second bracket is provided with at least one hook, the second bracket further comprises a supporting part, and the clamping part is connected to the base plate through the supporting part, and the clamping part is arranged on a side of the second bracket close to the supporting sheet, and the hook is configured to be clamp-fitted with the clamping part.

In some examples, a side of the second bracket away from the supporting sheet is provided with a first reinforcing rib, and the first reinforcing rib connects the second bracket with the base plate; and a side of the second bracket close to the supporting sheet is provided with a second reinforcing rib, and the second reinforcing rib connects the supporting part with the clamping part.

In some examples, the hook comprises a clamping surface engaged with the clamping part and a circular arc surface connected with the clamping surface.

In some examples, the first bracket is provided with at least one through hole.

In some examples, an end of the supporting sheet away from the base plate is provided with a supporting surface.

In some examples, in the first state, an included angle between the supporting sheet and the base plate is in a range from 40 to 60 degrees.

In some examples, in the second state, the supporting sheet is perpendicular to the base plate.

In some examples, the plurality of glue-dispensing bumps are distributed in an array on the base plate.

In some examples, the number of the glue-dispensing bumps is two, four or six.

In some examples, the supporting column is of an integrally formed structure.

At least one embodiment of the disclosure provides a light bar comprising the supporting column according to any items as mentioned above.

At least one embodiment of the disclosure provides a backlight module comprising the light bar according to any items as mentioned above.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
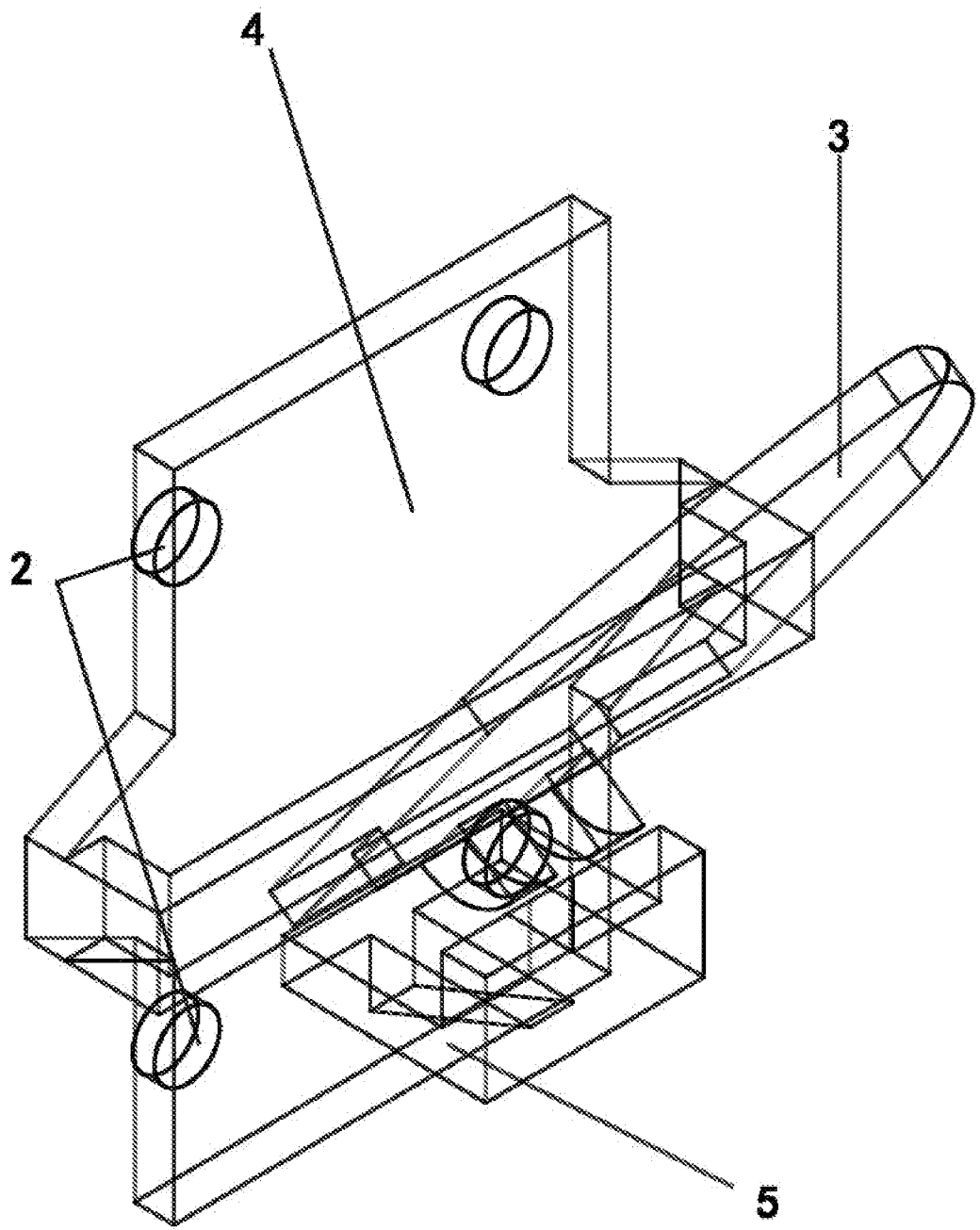
FIG. 1 is a stereoscopic view of a supporting column according to an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the invention. Based on the described embodiments herein, those skilled in the art can obtain other embodiment(s), without any inventive work, which should be within the scope of the disclosure.

A typical structure of the backlight module includes three laterally arranged LED bars, and ten supporting columns among these LED bars for support. There are two commonly used fixing methods for the supporting columns in the industry, one of which is to fix the supporting columns on a backboard with screws, and the other is to stick the supporting columns on the backboard with double-sided adhesive tapes. The approximate amounts of the supporting columns used in the industry may be as follows: 8 for 43 inches; 10 for 50 inches; 12 for 55 inches; 20 for 65 inches; and 24 for 75 inches (in each set of data, the latter is the size of the backlight module and the former is the corresponding number of the supporting columns). Generally, the larger the size, the more supporting columns need to be used.

However, the above-mentioned two methods for supporting involve the following disadvantages: when using screws to fix the supporting columns, each supporting column needs two screws, so the number of the screws as required will be: 16 for 43 inches; 20 for 50 inches; 24 for 55 inches; 40 for 65 inches; and 48 for 75 inches (in each set of data, the latter is the size of the backlight module and the former is the corresponding number of the screws). This may require for lots of manpower to work at the same time in order to keep up with the production efficiency, which results in poor production efficiency. When using double-sided adhesive tapes to stick the supporting columns, the supporting column is stuck on the backboard with a white double-sided adhesive tape which is attached in advance outside the production line, so that during assembling, a release paper can be torn off from the double-sided adhesive tape and the double-sided adhesive tape can be used for sticking, which obviously improves the efficiency as compared with using screws. However, the double-sided adhesive tape itself has the risk of falling off, and an adhesion capability thereof is decreased with time and affected by the operation of a worker. If the worker fails to press against the double-sided adhesive tape with a consistent force or fails to perform a pressing operation, the double-sided adhesive tape will easily fall off during transportation due to vibration or during sea transportation due to high temperature.

Therefore, the fixing method by using supporting columns as adopted in the existing technology requires for more manpower, and the quality is difficult to guarantee because there is the risk of falling off for the double-sided adhesive tapes. At present, the industry is still exploring the technical direction of fixing the supporting column on the light bar. However, when the supporting column is fixed on the light bar, the total height of the light bar and the supporting column will be relatively larger, so that the packaging volume under the same packaging condition will drop sharply, which is unacceptable for manufacturers of light bars and hinders the realization and development of the technical route.

Figure 2:
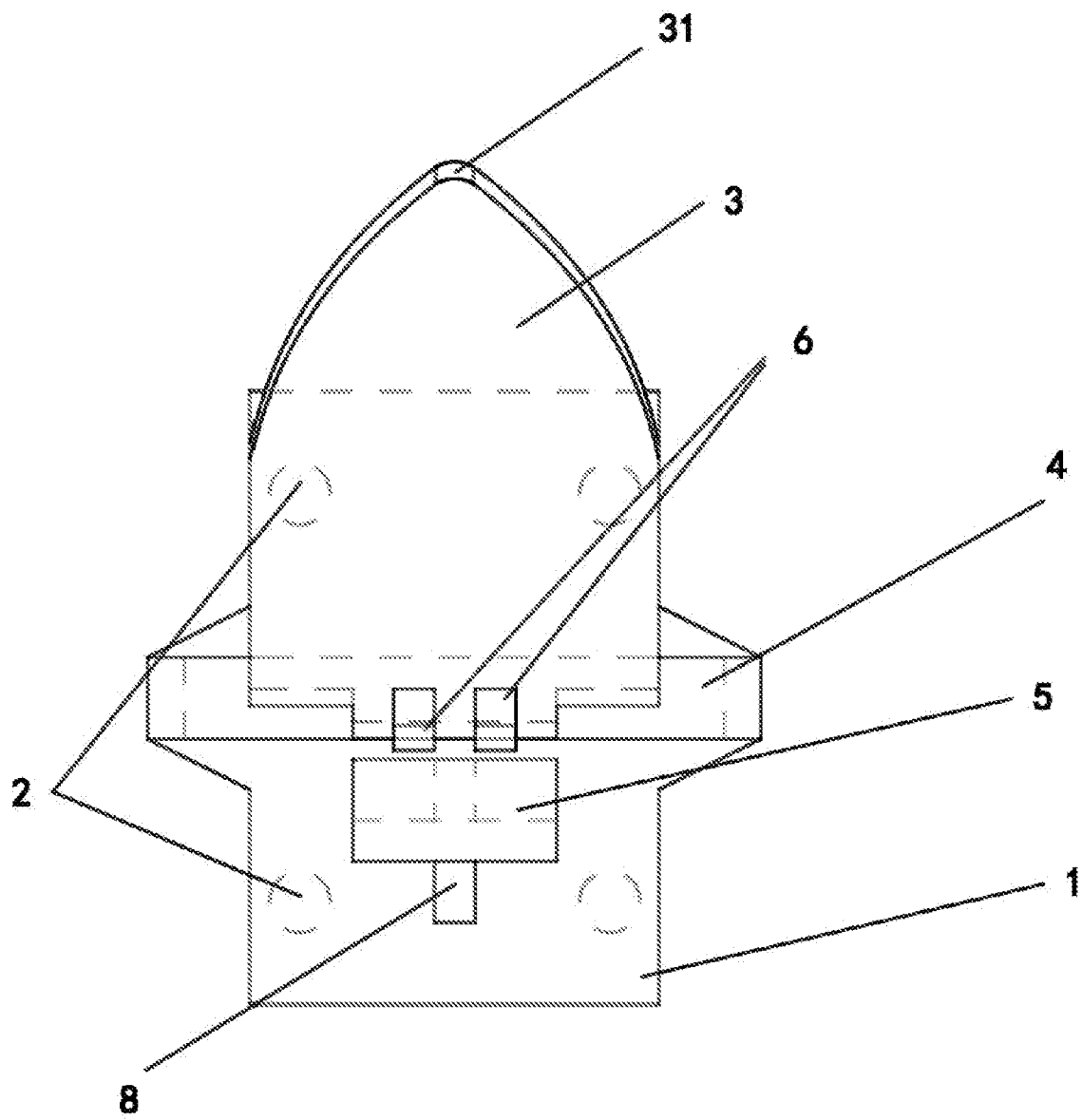
FIG. 2 is a front view of the supporting column shown in FIG. 1.
Figure 3:
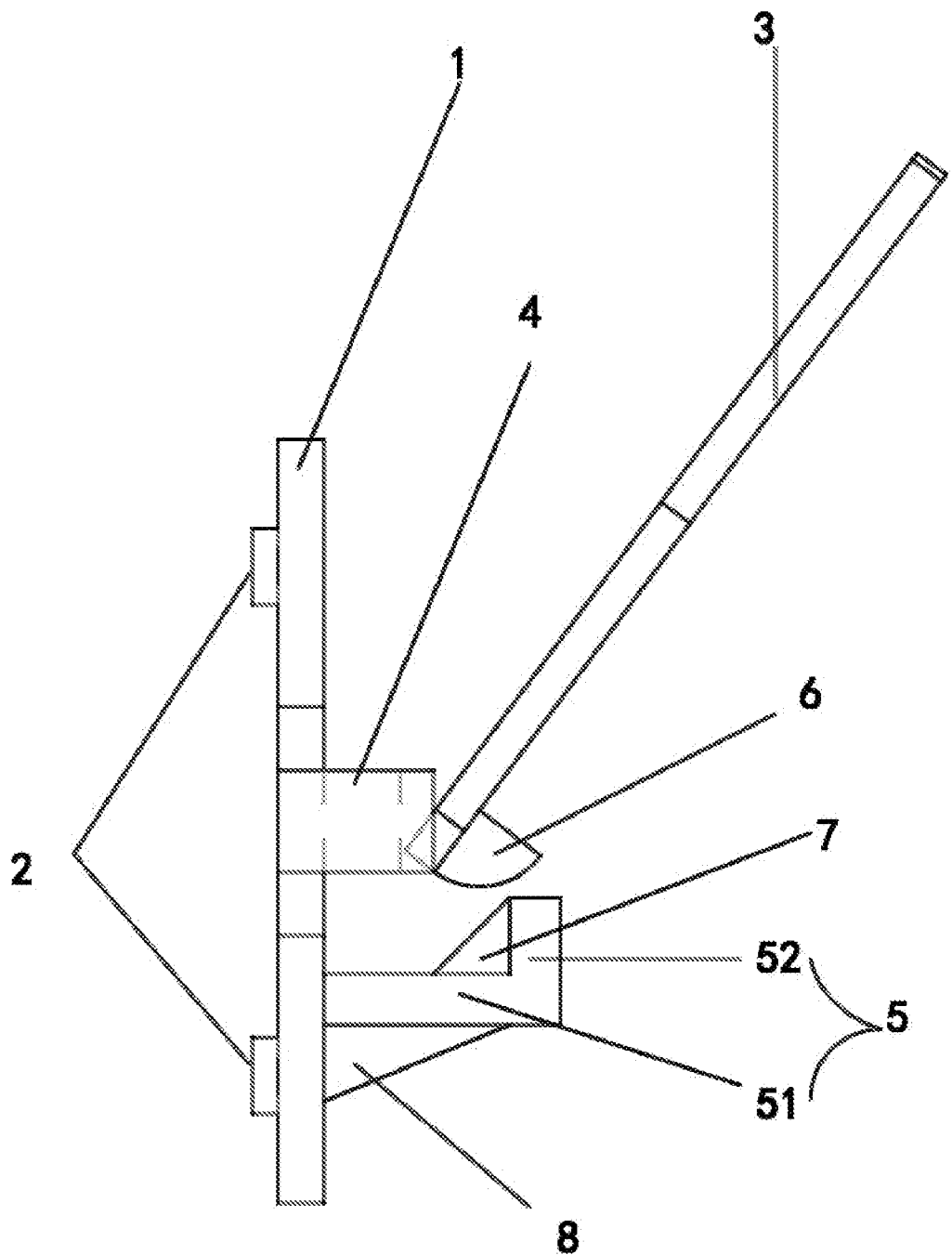
FIG. 3 is a side view of the supporting column shown in FIG. 1.
Figure 4:
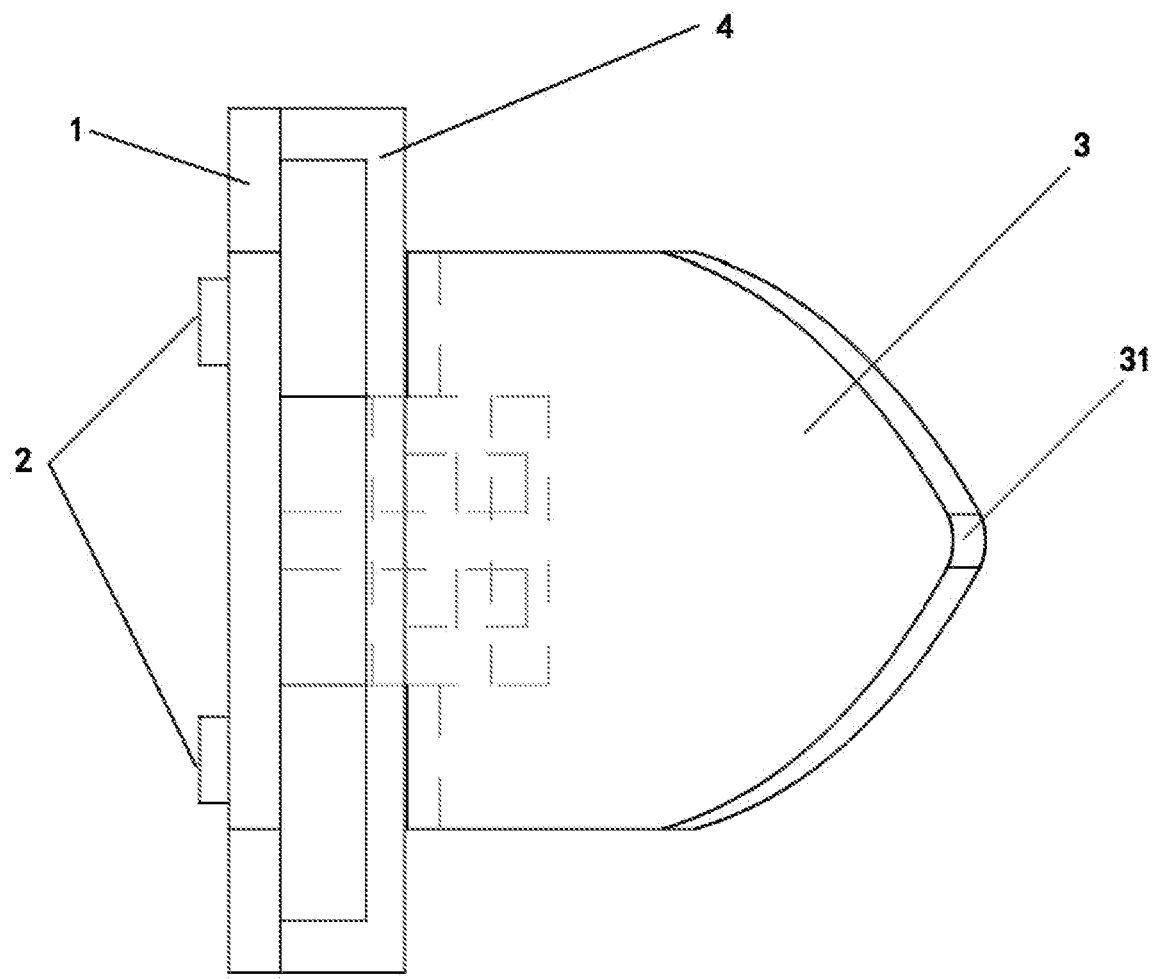
FIG. 4 is a top view of the supporting column shown in FIG. 1.

According to an embodiment of the present disclosure, a supporting column fixed on a light bar is provided. FIG. 1 is a stereoscopic view of a supporting column according to an embodiment of the present disclosure; FIG. 2 is a front view of the supporting column shown in FIG. 1; FIG. 3 is a side view of the supporting column shown in FIG. 1; FIG. 4 is a top view of the supporting column shown in FIG. 1; and reference will be made to FIGS. 1 to 4. The supporting column includes a base plate 1, a plurality of glue-dispensing bumps 2 and a supporting sheet 3. The glue-dispensing bumps 2 and the supporting sheet 3 are arranged on two opposite sides of the base plate 1, respectively, and the glue-dispensing bumps 2 are configured to be fixedly connected with the light bars. For example, the base plate is a plate-shaped member, the glue-dispensing bumps 2 are arranged on a side of the plate-shaped member, and the supporting sheet 3 is arranged on the other side of the plate-shaped member opposite to the side where the glue-dispensing bumps 2 are arranged.

The side of the base plate 1 where the supporting sheet 3 is arranged is provided with a first bracket 4, the first bracket 4 is connected with the supporting sheet 3, and the supporting sheet 3 can be rotated in a direction towards the base plate 1 and a direction away from the base plate 1. For example, the first bracket 4 and the supporting sheet 3 are hinged with each other. For example, the first bracket 4 and the supporting sheet 3 are pivoted with each other, but the embodiments according to the present disclosure are not limited to this. In some other embodiments, one end of the supporting sheet 3 can be fixedly connected with the first bracket 4, and a part of the supporting sheet 3 can be of a flexible structure or include a hinge structure, so that the supporting sheet 4 can be rotated in the direction towards the base plate 1 and the direction away from the base plate 1.

The side of the base plate 1 where the supporting sheet 3 is arranged is further provided with a second bracket 5, and the second bracket 5 is configured to be clamp-fitted with the supporting sheet 3, so that the supporting sheet 3 is fixedly arranged during clamping.

Although the first bracket and the second bracket are provided in the above embodiment, the embodiments according to the present disclosure are not limited to this. For example, the embodiment of the present disclosure is neither limited to the case where the supporting sheet is connected to the base plate through the first bracket, nor limited to the case where a clamping part described below is arranged on the base plate through the second bracket. For example, the supporting sheet can also be directly connected to the base plate, and the clamping part can also be directly connected to the base plate.

The supporting column provided in the present embodiment is fixed on a flexible printed circuit board of the light bar, and when the backlight module is assembled, the supporting column on the light bar supports the diffuser plate, so that a series of problems caused by the collapse of the diffuser plate can be avoided; in this way, it can maintain the optical distance formed on the diffuser plate unchanged, and can achieve uniform brightness. The supporting column is fixed on the light bar, and the supporting column has been set up when the light bar is prepared. The light bar can be directly prepared by manufacturers thereof through automated operations. Moreover, the preparation of the light bar per se includes a manufacture procedure of a lens, and the fixing of the supporting column can be the same as the fixing of the lens, without the need of adding a processing equipment.

The supporting column provided by the present embodiment includes a base plate 1, wherein the size of the base plate 1 is, for example, 15 mm*10 mm*0.9 mm. The size of the flexible printed circuit board of the light bar is usually 12 mm, thus the width of the base plate 1 is 10 mm so as not to go beyond the flexible printed circuit board. The length of 15 mm is designed to increase the distance between the glue-dispensing bumps 2. According to the lever principle, the greater the distance, the firmer the fixation between the base plate 1 and the light bar. The thickness of 0.9 mm is designed because the base plate is disposed under a reflective sheet. In order not to jack up the reflective sheet, the thickness of the base plate is set to be as small as possible, and 0.9 mm is a value that gives consideration to both strength and thickness. It should be noted that the above size range is only exemplary and can be adjusted according to actual situations.

In some examples, the base plate 1 is provided with a first bracket 4, and the first bracket 4 is fixedly connected with the supporting sheet 3, which itself is a rotatable structure and can be rotated around a connection point between the supporting sheet 3 and the first bracket 4. In the present embodiment, the supporting sheet only needs to be changed from a state shown in FIG. 3 to a state shown in FIG. 5, so as to realize the clamp-fitted connection between the supporting sheet 3 and the second bracket 5.

Figure 6:
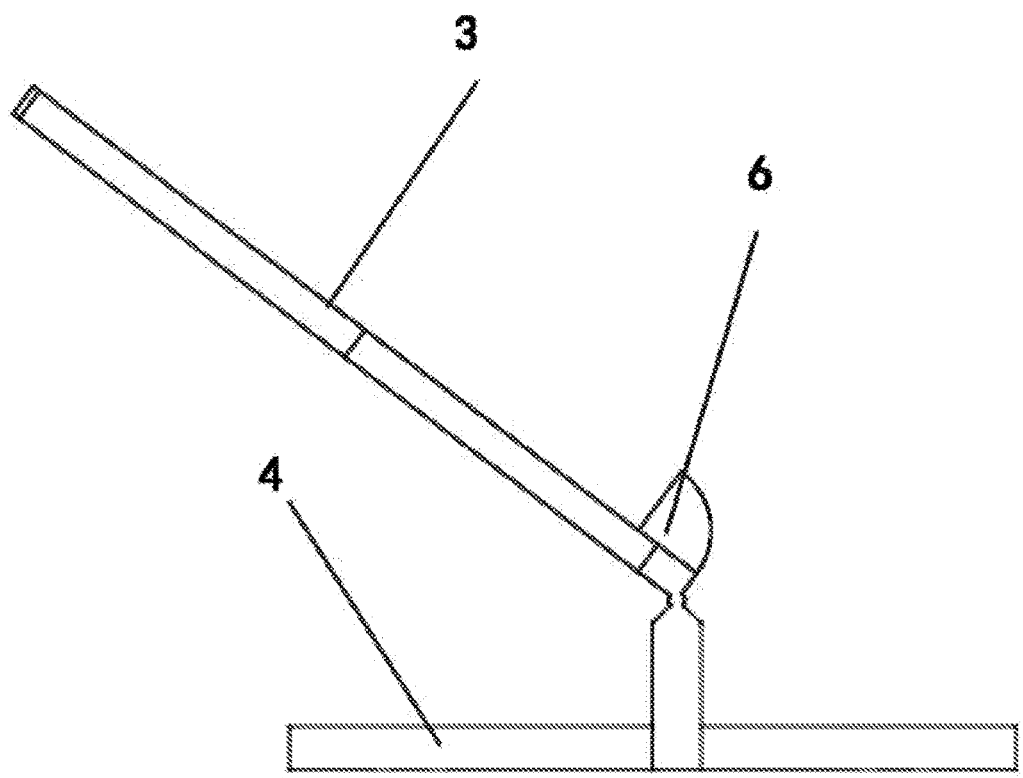
FIG. 6 is a schematic view illustrating structures of a supporting sheet and a base plate according to another embodiment of the present disclosure.

As shown in FIG. 6, the present embodiment also provides another connecting mode between the supporting sheet 3 and the first bracket 4. Through a semi-connection between the supporting sheet 3 and the first bracket 4, the rotation function can also be realized, but the strength of such structure is relatively weak. The connection strength between the supporting sheet 3 and the first bracket 4 can be increased by increasing the thickness of a connecting part therebetween. Alternatively, different portions can be prepared by adopting materials of two colors, for example, the portion below the connecting part is made of white-colored high-toughness plastic, and the portion where the supporting sheet 3 is located is made of transparent PC material, so that the portion where the first bracket 4 is located has higher strength.

Figure 5:
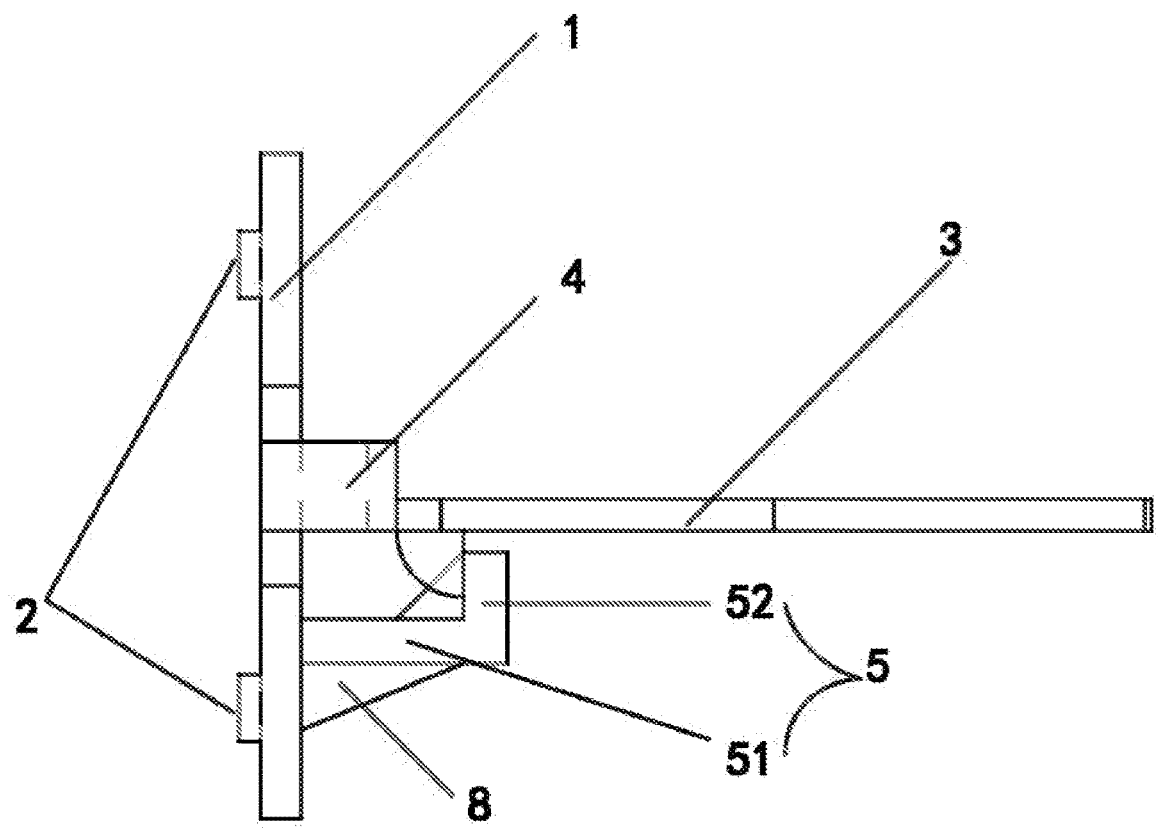
FIG. 5 is a schematic view illustrating a usage state of a supporting column according to an embodiment of the present disclosure.

In the present embodiment, the base plate 1 is further provided with a second bracket 5 configured to be clamp-fitted with the supporting sheet 3, so that the position of the supporting sheet 3 can be changed, resulting in the change from the state shown in FIG. 3 to the state shown in FIG. 5. When the supporting column structure is in the process of preparation and transportation, the state shown in FIG. 3 is adopted, and at this time, the supporting column can be arranged on the light bar and transported in a stacked manner. When the supporting column is to be used, the supporting sheet 3 is rotated to the position shown in FIG. 5, then the supporting sheet 3 is clamp-fitted with the second bracket 5, so that the supporting sheet 3 is fixed and supports the reflective sheet.

Further, a side of the supporting sheet 3 close to the second bracket 5 is provided with at least one hook 6, and the second bracket 5 includes a clamping part 52 and a supporting part 51 which are connected with each other, wherein the clamping part 52 is arranged on a side of the second bracket 5 close to the supporting sheet 3, and the hook 6 is clamp-fitted with the clamping part 52 so as to fix the supporting sheet 3.

In the present embodiment, the hook 6 provided on the supporting sheet 3 and the clamping part 52 provided on the second bracket 5 are engaged with each other in a clamping manner. For example, a surface of the hook 6 and a surface of the clamping part 52 configured to be clamp-fitted with each other are both set as planar surfaces to increase a contact area therebetween after the clamping connection, so that the supporting column is fixed firmly and not easy to fall off when it's in the state shown in FIG. 5.

In some examples, after the supporting sheet 3 is clamp-fitted with the second bracket 5, it is configured such that the supporting sheet 3 is perpendicular to the base plate 1, that is, in FIG. 5, the supporting sheet 3 is perpendicular to the base plate 1; and when the supporting column structure is installed on the light bar, the supporting sheet 3 is perpendicular to the light bar, so that the reflective sheet can be supported in a better way.

In the present embodiment, the second bracket 5 is provided with a clamping part clamp-fitted with the hook 6, and a supporting part; the surface of the clamping part intended to be clamp-fitted with the hook 6 is configured as a planar surface to increase the contact area therebetween. For example, if the clamping part and the supporting part are configured to be L-shaped as shown in FIG. 3, the structure is relatively simple and easy to realize. In the state shown in FIG. 3, a certain spacing distance is provided between the hook 6 and the second bracket 5 which are not in contact with each other.

For example, in an initial state (i.e., the state during preparation and transportation), an included angle between the supporting sheet 3 and the base plate 1 is degrees. In the present embodiment, after the completion of the preparation of the supporting column, a certain included angle is formed between the supporting sheet 3 and the base plate 1. When the supporting column is to be used, the state thereof shown in FIG. 5 can be obtained by toggling the supporting sheet 3. By setting a certain included angle between the supporting sheet 3 and the base plate 1, the height of the prepared supporting column is not too large. For example, when the included angle between the supporting column and the base plate 1 is 45 degrees, the height of the supporting column as formed is only about half of the height of the supporting sheet 3, and a plurality of supporting columns can still be placed in the original packaging stack, which will not cause a sharp reduction in the number of packages, and can be smoothly introduced into the whole industry without too much modifications.

The included angle between the supporting sheet 3 and the base plate 1 can be adjusted according to the height of the supporting sheet 3. If the height of the supporting sheet 3 is relative larger, the included angle between the supporting sheet 3 and the base plate 1 can be appropriately made smaller. For example, the included angle between the supporting sheet 3 and the base plate 1 is 45 degrees, which facilitates mold making and is also convenient for demoulding in the production process.

Further, the hook 6 includes a clamping surface engaged with the clamping part and a circular arc surface connected with the clamping surface.

In order to facilitate the change of the position state of the supporting sheet 3 from FIG. 3 to FIG. 5, the hook 6 on the supporting sheet 3 is configured in the form of a clamping surface and a circular arc surface which are connected with each other, wherein the clamping surface is set as a planar surface, for example, and the circular arc surface can reduce the resistance effect when the supporting sheet 3 is toggled, so that the state of the supporting sheet 3 can be changed more easily. For example, the cross-sectional surface of the hook 6 is in the shape of one quarter of a circle.

In some examples, the first bracket 4 is provided with at least one through hole. In the present embodiment, the supporting sheet 3 is connected with the first bracket 4, and the supporting sheet 3 needs to be rotated to change the position state. Therefore, the first bracket 4 connected with the supporting sheet 3 needs to be deformed to a certain extent so as to facilitate changing the position state of the supporting sheet 3. For example, the first bracket 4 is provided with a through hole, so that the strength of the first bracket 4 is more or less reduced and the first bracket 4 is easier to deform. The number of the through holes and the cross-sectional shape can be varied, which can be selected according to the actual situation; alternatively, the structure as shown in FIGS. 1-4 can be adopted, wherein the first bracket 4 is configured as a U-shaped structure to form a hollowed shape, which can also facilitate the deformation of the first bracket 4. For example, the first bracket 4 has a thickness of 0.9 mm, a width of 2 mm and a length of mm. The length of the first bracket 4 is greater than the width of the base plate 1, which allows the first bracket 4 to be longer and more flexible in structure, thus providing better torque without breaking.

In some examples, the side of the second bracket 5 away from the supporting sheet 3 is provided with a first reinforcing rib 8, and the first reinforcing rib 8 connects the second bracket 5 with the base plate 1.

The side of the second bracket 5 close to the supporting sheet 3 is provided with a second reinforcing rib 7, and the second reinforcing rib 7 connects the supporting part with the clamping part.

In the present embodiment, the second bracket 5 is clamp-fitted with the supporting sheet 3, so that the position of the supporting sheet 3 is limited by the second bracket 5. The structure of the second bracket 5 needs to be strong and not easy to deform. Correspondingly, the structural strength of the second bracket 5 is increased by arranging two reinforcing rib structures. For example, the reinforcing ribs are respectively arranged between the second bracket 5 and the base plate 1, and between the supporting part and the clamping part, so as to provide reinforcing effects in both directions. The number of the reinforcing ribs as arranged can be selected according to actual situations, as long as it does not affect the clamp-fitted connection between the supporting sheet 3 and the clamping part.

Further, one end of the supporting sheet 3 away from the base plate 1 is provided with a supporting surface 31.

In the present embodiment, the reflective sheet is supported by the structure of the supporting sheet 3 as arranged, and the supporting sheet 3 can be configured in various shapes, such as square, round, oval and so on. In some examples, the supporting sheet is configured as V-shape, which can save a certain amount of materials; and the end of the supporting sheet 3 away from the base plate 1, that is, the top end, is provided with the supporting surface 31 which is a planar surface. The area of the planar surface is not intended to be too large, and can be selected according to actual situations. The reflective sheet can be supported by the planar surface, which is not intended to be too sharp to damage the reflective sheet, either.

For example, in the present embodiment, the structure that the supporting sheet 3 is perpendicular to the base plate 1 is obtained after the supporting sheet 3 is rotated to be fixed, which can be adjusted according to different situations. The supporting sheet 3 having been fixed may be inclined, as long as it ensures that the supporting surface at the top end of the supporting sheet 3 is configured as a planar structure and also a horizontal, planar surface. In this way, it can also support the reflective sheet through the supporting surface 31.

For example, the plurality of glue-dispensing bumps 2 are distributed in an array on the base plate 1.

In the present embodiment, the back surface of the base plate 1 is further provided with a plurality of glue-dispensing bumps 2, which are fixed on the flexible printed circuit board of the light bar by dispensing UV curing glues at corresponding positions on the flexible printed circuit board of the light bar. The glue-dispensing bumps 2 as arranged can gather the UV curing glues together, so that the glues will not be dispersed into a larger area. For example, the glue-dispensing bumps 2 are arranged in an array structure so that the force as generated can be more uniform.

For example, the number of the glue-dispensing bumps 2 is two or four or six. The cross-sectional area of the glue-dispensing bump 2 may be inversely related to the number of the glue-dispensing bumps 2.

In the present embodiment, the number of the glue-dispensing bumps 2 can be determined according to the size of the base plate 1. For example, as shown in FIG. 2, four bumps can be arranged. The four bumps are fixed on the flexible printed circuit board of the light bar, and can provide a push-and-pull force of about 15 kg, thus are extremely firm. The arrangement mode of the glue-dispensing bumps 2 can also be changed according to actual situations.

In the process of preparing a light bar, it is necessary to arrange a lens on the light bar, and the lens is also fixed on the flexible printed circuit board of the light bar through corresponding bumps and UV curing glues. Therefore, in the present embodiment, the supporting column is connected to the light bar by arranging the glue-dispensing bumps 2 on the supporting column; the process of connecting the supporting column to the light bar is compatible with the process of connecting the lens to the light bar, and the glues for fixing the lens and the glues for fixing the supporting column can be applied at the same time without additional processes. Moreover, the UV curing glue is cured quickly by ultraviolet irradiation, which is safe and reliable. Thus it can be seen, such structure can be obtained on a production line of an automatic equipment, which needs not to add a processing equipment for a factory of light bas but only increases the corresponding amounts of connection spots. In this way, the fixing efficiency of the supporting column can be greatly improved.

In some embodiments, the supporting column is an integrally formed structure, for example, by an injection molding process.

In the present embodiment, the supporting column is integrally produced by an injection molding process, and a single mold can be made to have dozens of holes. Through a single injection molding process, dozens of products can be molded, and the number of the products is generally between 30 and 60, which means a higher production efficiency.

Generally speaking, the height of the supporting column provided by the present embodiment is 20 mm in the structure shown in FIG. 5, and the included angle between the supporting sheet 3 and the base plate 1 is 45 degrees, thus the total height of the structure shown in FIG. 3 is 17.5 mm. In the case where a plurality of supporting columns are put onto packaging trays for packaging, when pressed by a packaging tray of a previous layer, the supporting sheet 3 can be rotated and hence can be compressed to 7-8 mm, which is consistent with the height of the layer. Thus, the light bar utilizing such supporting column can still adopt original package. When the light bar with the fixed supporting column is taken out of the package, the supporting sheet 3 will recover part of its height due to the elastic property caused by the rotation. By manually toggling the supporting sheet 3, it is rotated to a position of 90 degrees (i.e., to be perpendicular to the base plate), during which the hook 6 and the clamping part are clamp-fitted with each other so as to prevent the supporting sheet 3 from rebounding to the position of 45 degrees, thereby maintaining the supporting sheet 3 at the position of 90 degrees and completing the assembling process.

According to the product provided by the present embodiment, when the light bars are placed on the production line, the corresponding supporting columns are also placed at the same time, thus saving the manpower and improving the productivity of the production line. Moreover, the product does not need screws or double-sided adhesive tapes, or even releasing papers, so that the materials are saved and the incidental manpower costs for manual assembling are reduced. In addition, by adopting the supporting column that is connected and fixed with the light bar, it can achieve a higher push-and-pull force and a resistance to high temperature, thereby considerably improving the product performance.

According to some embodiments of the present disclosure, the following supporting columns fixed on the light bar are provided.

(1) A supporting column fixed on a light bar, including a base plate, a plurality of glue-dispensing bumps and a supporting sheet, wherein the glue-dispensing bumps and the supporting sheet are arranged on two opposite sides of the base plate, respectively, and the glue-dispensing bumps are configured to be fixedly connected with the light bar; a side of the base plate where the supporting sheet is arranged is provided with a first bracket, the first bracket is fixedly connected with the supporting sheet, and the supporting sheet can be rotated in a direction towards the base plate and a direction away from the base plate; the side of the base plate where the supporting sheet is arranged is further provided with a second bracket, and the second bracket is configured to be clamp-fitted with the supporting sheet, so that the supporting sheet is fixedly arranged upon being clamped.

(2) The supporting column fixed on the light bar according to (1), wherein a side of the supporting sheet close to the second bracket is provided with at least one hook, and the second bracket includes a clamping part and a supporting part which are connected with each other, wherein the clamping part is arranged on a side of the second bracket close to the supporting sheet, and the hook is clamp-fitted with the clamping part for fixing the supporting sheet.

(3) The supporting column fixed on the light bar according to (2), wherein a side of the second bracket away from the supporting sheet is provided with a first reinforcing rib, and the first reinforcing rib connects the second bracket with the base plate; a side of the second bracket close to the supporting sheet is provided with a second reinforcing rib, and the second reinforcing rib connects the supporting part with the clamping part.

(4) The supporting column fixed on the light bar according to (2), wherein the hook includes a clamping surface engaged with the clamping part, and a circular arc surface connected with the clamping surface.

(5) The supporting column fixed on the light bar according to any one of (1) to (4), wherein the first bracket is provided with at least one through hole.

(6) The supporting column fixed on the light bar according to any one of (1) to (4), wherein an end of the supporting sheet away from the base plate is provided with a supporting surface.

(7) The supporting column fixed on the light bar according to any one of (1) to (4), wherein an included angle between the supporting sheet and the base plate is 40-60 degrees.

(8) The supporting column fixed on the light bar according to any one of (1) to (4), wherein the plurality of glue-dispensing bumps are distributed in an array on the base plate.

(9) The supporting column fixed on the light bar according to (8), wherein the number of the glue-dispensing bumps is two or four or six, and a cross-sectional area of the glue-dispensing bump is inversely related to the number of the glue-dispensing bumps.

(10) The supporting column fixed on the light bar according to any one of (1) to (4), wherein the supporting column is an integral structure formed by an injection molding process.

The above merely are exemplary embodiments of the present disclosure, and are not intended to limit the protection scope of the present disclosure, which is determined by the appended claims.

The invention claimed is:

1. A supporting column fixed on a light bar, comprising:
   a base plate;
   a supporting sheet arranged on a side of the base plate, wherein one end of the supporting sheet is connected with the base plate and the supporting sheet is configured to be rotatable in a direction towards the base plate and a direction away from the base plate, so that the supporting sheet has a first state and a second state, and an included angle between the supporting sheet and the base plate in the first state is smaller than that in the second state; and
   a clamping part configured to be clamp-fitted with the supporting sheet upon the supporting sheet being in the second state so as to fix the supporting sheet.

2. The supporting column fixed on the light bar according to claim 1, further comprising:
   a plurality of glue-dispensing bumps arranged on a side of the base plate opposite to the side where the supporting sheet is arranged, and the glue-dispensing bump is configured to be fixedly connected with the light bar.

3. The supporting column fixed on the light bar according to claim 1, further comprising:
   a first bracket arranged on the side of the base plate provided with the supporting sheet, and the supporting sheet being connected to the base plate through the first bracket; and
   a second bracket arranged on the side of the base plate provided with the supporting sheet, and the clamping part being arranged on the second bracket.

4. The supporting column fixed on the light bar according to claim 3, wherein a side of the supporting sheet close to the second bracket is provided with at least one hook,
   the second bracket further comprises a supporting part, and the clamping part is connected to the base plate through the supporting part, and the clamping part is arranged on a side of the second bracket close to the supporting sheet, and the hook is configured to be clamp-fitted with the clamping part.

5. The supporting column fixed on the light bar according to claim 3, wherein a side of the second bracket away from the supporting sheet is provided with a first reinforcing rib, and the first reinforcing rib connects the second bracket with the base plate; and
   a side of the second bracket close to the supporting sheet is provided with a second reinforcing rib, and the second reinforcing rib connects the supporting part with the clamping part.

6. The supporting column fixed on the light bar according to claim 4, wherein the hook comprises a clamping surface engaged with the clamping part and a circular arc surface connected with the clamping surface.

7. The supporting column fixed on the light bar according to claim 3, wherein the first bracket is provided with at least one through hole.

8. The supporting column fixed on the light bar according to claim 1, wherein an end of the supporting sheet away from the base plate is provided with a supporting surface.

9. The supporting column fixed on the light bar according to claim 1, wherein, in the first state, an included angle between the supporting sheet and the base plate is in a range from 40 to 60 degrees.

10. The supporting column fixed on the light bar according to claim 1, wherein, in the second state, the supporting sheet is perpendicular to the base plate.

11. The supporting column fixed on the light bar according to claim 2, wherein the plurality of glue-dispensing bumps are distributed in an array on the base plate.

12. The supporting column fixed on the light bar according to claim 11, wherein the number of the glue-dispensing bumps is two, four or six.

13. The supporting column fixed on the light bar according to claim 1, wherein the supporting column is of an integrally formed structure.

14. A light bar, comprising the supporting column according to claim 1.

15. A backlight module, comprising the light bar according to claim 14.

* * * * *